United States Patent
Bhattacharya et al.

(10) Patent No.: US 11,734,482 B1
(45) Date of Patent: Aug. 22, 2023

(54) VISUAL REPRESENTATION TO ASSESS QUALITY OF INPUT STIMULUS IN TRANSISTOR-LEVEL CIRCUITS

(71) Applicant: Synopsys, Inc., Mountain View, CA (US)

(72) Inventors: Mayukh Bhattacharya, Palo Alto, CA (US); Aleksandrs Krjukovs, San Jose, CA (US); Chih-Ping Antony Fan, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/522,566

(22) Filed: Nov. 9, 2021

Related U.S. Application Data

(60) Provisional application No. 63/111,507, filed on Nov. 9, 2020.

(51) Int. Cl.
*G06F 30/3308* (2020.01)
*G06F 30/343* (2020.01)
*G06F 30/347* (2020.01)

(52) U.S. Cl.
CPC ........ *G06F 30/343* (2020.01); *G06F 30/3308* (2020.01); *G06F 30/347* (2020.01)

(58) Field of Classification Search
USPC ........................................................ 716/102
See application file for complete search history.

(56) References Cited

U.S. PATENT DOCUMENTS

| | | | |
|---|---|---|---|
| 6,807,520 B1 | 10/2004 | Zhou et al. | |
| 7,340,698 B1 | 3/2008 | Srinivasan et al. | |
| 10,409,941 B2 | 9/2019 | Bhattacharya et al. | |
| 10,635,770 B1 * | 4/2020 | Wu | G06F 30/327 |

OTHER PUBLICATIONS

Acuna, E. L. et al. "Simulation Techniques for Mixed Analog/Digital Circuits." IEEE Journal of Solid-State Circuits, vol. 25, No. 2, Apr. 1990, pp. 353-363.
Shih, Y-H. et al. "Illiads: A New Fast MOS Timing Simulator Using Direct Equation-Solving Approach." 28th ACM/IEEE Design Automation Conference, Jun. 17-21, 1991, pp. 20-25.
Wikipedia. "Sparkline." Wikipedia: The Free Encyclopedia, Mar. 9, 2022, 3 pages, [Online] [Retrieved May 23, 2022], Retrieved from the Internet <URL:https://en.wikipedia.org/wiki/Sparkline>.

* cited by examiner

*Primary Examiner* — Bryce M Aisaka
(74) *Attorney, Agent, or Firm* — Fenwick & West LLP

(57) ABSTRACT

In one aspect, a transistor-level description of a circuit is accessed, where the circuit includes a plurality of transistors. A transistor-level circuit simulation of the circuit's response to an input stimulus is performed, based on the transistor-level description of the circuit. Activity levels for the transistors in the circuit are determined from the transistor-level circuit simulation. A graphical representation of the circuit is rendered. The graphical representation contains graphical elements that represent components of the circuit, and the graphical elements are visually coded according to the activity levels of the transistors in the corresponding components.

20 Claims, 13 Drawing Sheets
(9 of 13 Drawing Sheet(s) Filed in Color)

VISUAL REPRESENTATION TO ASSESS QUALITY OF INPUT STIMULUS IN TRANSISTOR-LEVEL CIRCUITS

RELATED APPLICATION

This application claims priority under 35 U.S.C. § 119(e) to U.S. Provisional Patent Application Ser. No. 63/111,507, "Visual Representation To Assess Quality Of Input Stimulus In Transistor-Level Circuits," filed Nov. 9, 2020. The subject matter of all of the foregoing is incorporated herein by reference in their entirety.

TECHNICAL FIELD

The present disclosure generally relates to an electronic design automation system. In particular, the present disclosure relates to a system and method for providing visual representation to assess input stimulus quality in transistor-level circuits.

BACKGROUND

For analog or mixed-signal circuit designs with a large number of devices (e.g., transistors), transistor-level circuit simulation is one way of predicting how the circuit may perform after manufacturing. Traditionally, this involves estimating various nodal voltages or branch currents or power to verify if they meet specifications or not. For this, there are several commercial tools and solutions available to the designer.

More recently, defect or fault sensitization in transistor-level simulation has gained importance, in part due to the automotive industry's focus on functional safety and due to increased interest in manufacturing test and reliability of analog components. Since analog fault or defect simulation can be expensive, getting an approximate but quick assessment of the quality and coverage of the test stimulus is desirable.

One current approach in the context of analog or mixed-signal testing is based on monitoring nodal voltages, branch currents, and their derivatives and trying to use such quantities to predict if an open or a short defect associated with a device would be covered by the test stimulus or not. Since such a method can, at best, only determine if a defect may be sensitized or not, in the absence of any estimation of whether the sensitized defect's effect would propagate to an observation point, the estimated defect coverage is often incorrect.

SUMMARY

In one aspect, a transistor-level description of a circuit is accessed, where the circuit includes multiple transistors. A transistor-level circuit simulation of the circuit's response to an input stimulus is performed based on the transistor-level description of the circuit. Activity levels for the transistors in the circuit are determined from the transistor-level circuit simulation. A graphical representation of the circuit is rendered. The graphical representation contains graphical elements that represent components of the circuit, and the graphical elements are visually coded according to the activity levels of the transistors (or other devices) in the corresponding components.

In some embodiments, there are two graphical representations that are both color coded: a hierarchical representation of the circuit based on transistors and a signal-flow representation of the circuit based on channel-connected blocks (as defined below). The two graphical representations are graphically cross-connected to provide the user with associations between the two representations.

In some embodiments, graphical representations for different input stimuli may be rendered and presented to allow comparison by the user.

Other aspects include components, devices, systems, improvements, methods, processes, applications, computer readable mediums, and other technologies related to any of the above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1A:
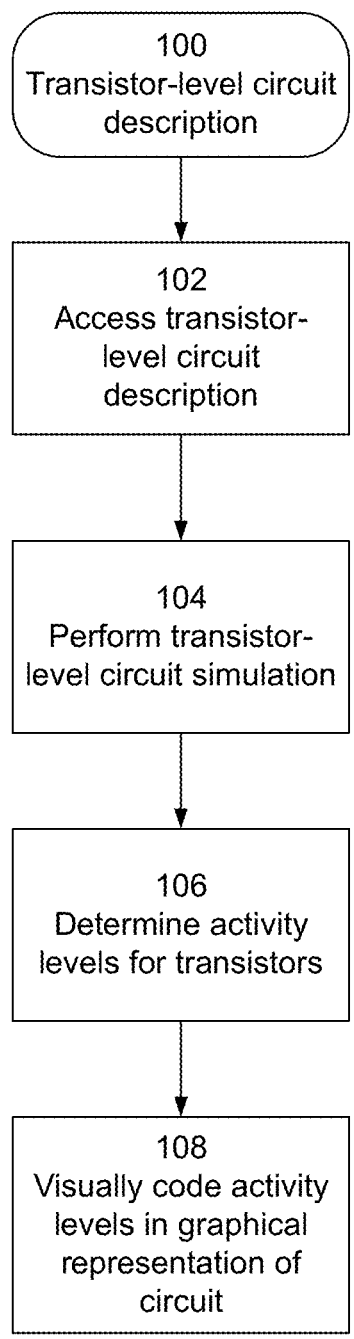
FIG. 1A depicts a flowchart for assessing quality of an input stimulus according to embodiments of the disclosure.

Aspects of the present disclosure relate to visual representations to assess quality and coverage of input stimulus for the simulation of transistor-level circuits. When simulating circuits, the quality of the test stimuli used, such as their coverage of the circuit, is important. Simulating a circuit with insufficient input stimuli will result in an insufficient simulation. Therefore, it is desirable to assess the quality of various input stimuli. The technology disclosed herein allows the designer to generate and visualize data that can lead to a quicker and more useful evaluation of input stimulus quality. This provides the user with the ability to develop better test stimuli with less effort.

In some embodiments, a transistor-level circuit simulation of the circuit's response to an input stimulus is performed.

The activity levels for transistors in the circuit are determined from the circuit simulation. For example, activity levels may be the number of times a transistor transitions between different states, such as cutoff, linear and saturation states.

The activity level may then be rendered into useful graphical representations. One possible representation is a treemap hierarchical representation of the circuit. Another possible representation is a CCB (channel-connected block) graph signal flow representation of the circuit. In these representations, the graphical elements represent components of the circuit (e.g., transistors or CCBs). The graphical elements may be color coded according to the activity levels of the transistors in the corresponding components.

Sparkline graphs of the activity levels and/or voltage levels may also be associated with the graphical elements. Different graphical representations may also be cross-connected to allow the user to view corresponding components in the different representations. Graphical representations of different input stimuli may also be presented to the user. This provides the user with a useful visual representation of the activity (or non-activity) level in the circuit, in response to various input stimuli. The user may then modify the set of input stimuli to provide good coverage of the circuit while reducing redundant input stimuli.

Various implementations of this approach may have the following characteristics and advantages:
- Defect or test coverage may not be required to be expressly estimated, as fault sensitization is a necessary but not sufficient aspect of coverage.
- Users may be provided with multiple cross-connected visual aids to understand the defect sensitization capability of a stimulus and how it compares with other stimuli This may help the user to decide on further course of action in improving coverage.
- This approach may enable the user to obtain in a visual way a better understanding of the shortcoming of their test coverage and relative merits or demerits of different tests for defects without expensive transistor-level defect or fault simulations.
- This approach may also be extended to other applications, such as circuit defect (hot-spot) prediction at a pre-layout stage of design.
- This approach provides circuit users with a method to evaluate the impact of an input stimulus by means of only one invocation of a circuit simulator.
- This approach lets users compare the effectiveness of different sets of input stimuli by an interactive graphical user interface.

FIG. 1A depicts a flowchart for assessing quality of an input stimulus according to embodiments of the disclosure. A transistor-level circuit description 100, for example as may be part of the design database for the circuit, is accessed at 102. A transistor-level circuit simulation of the circuit's response to an input stimulus is performed using the transistor-level circuit description, at 104. The activity levels for transistors in the circuit are determined from the circuit simulation, at 106. The activity levels may then be visually coded in various graphical representations of the circuit, at 108. For example, the graphical representation may include graphical elements that represent different components of the circuit, and these graphical elements are color coded according to the activity level.

Figure 1B:
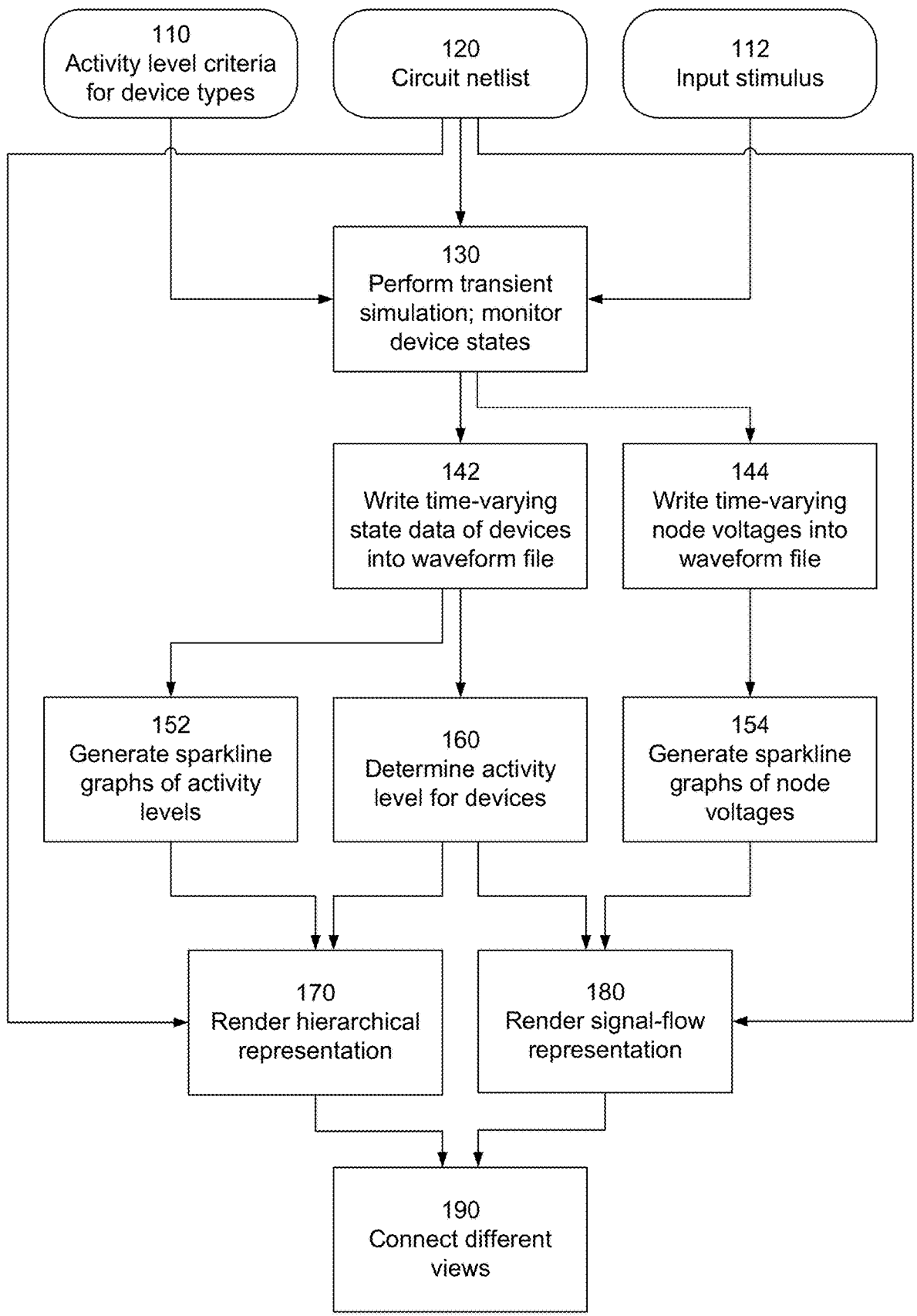
FIG. 1B depicts another flowchart for assessing quality of an input stimulus according to embodiments of the disclosure.

FIG. 1B depicts another flowchart for assessing quality of an input stimulus according to embodiments of the disclosure. 110, 112 and 120 include inputs to the process. The user provides a circuit netlist 120 with input stimuli 112 set up for transient simulation and, optionally, activity level criteria 110 for measuring device activity. 170 and 180 are outputs of the process. The various elements in the flowchart are described in more detail below.

According to one embodiment, the system receives activity level criteria 110 to be tracked or provides default activity level criteria. In one default, the criteria for the device activity levels are based on monitoring states of a device and transitions between the states. Devices are predominantly transistors (e.g., complementary metal oxide semiconductor (CMOS), bipolar junction transistor (BJT), and junction field effect transistor (JFET)), but could also be other non-linear elements such as diodes or linear elements, for example design (non-parasitic) resistors, capacitors, or inductors. For instance, for a metal oxide semiconductor field effect transistor (MOSFET), the system may monitor whether the MOSFET is operating in a cutoff, linear, or saturation operating region during the transient transistor-level simulation. The activity level may be the number of transitions between these different operating regions (states). For other devices, the system may look for similar types of states. For example, for diodes, the system may monitor whether the diode is operating in forward or reverse-bias operating regions. For BJTs, the states of interest may be forward-active, reverse-active, cut-off, and saturation operating regions. In some embodiments, the system receives user-defined activity criteria per device type (e.g., MOSFET, BJT, and diodes). The system then tracks activity levels based on those states during the transient circuit simulation. Other types of activity levels may be based on nodal voltages (i.e., voltages at nodes of the circuit) and their derivatives, or on branch currents (i.e., currents flowing through branches of the circuit) and their derivatives.

According to one embodiment, the system receives an input stimulus 112 to perform transient simulation. For example, voltage stimulus could be applied to each input port of the circuit. These stimuli could be just normal functional input stimuli for the circuit or could be specifically designed to test various parts of the circuit. The system may provide visualization of the activity levels for an input stimulus. The activity levels of many different input stimuli may also be visualized, and visually compared to provide information about the aggregate coverage of the set of test stimuli.

According to one embodiment, the system receives a desired circuit netlist 120. The circuit netlist may be in a format, including but not limited to, SPICE, SPECTRE, and ELDO formats. The circuit netlist includes a transistor-level (device-level) description.

At 130, the system performs transient transistor-level circuit simulation and records the activity level of the devices by saving or counting the device states over the course of the simulation. The system may also record the nodal voltages and/or branch currents of the circuit.

In this example, for each device, the system saves the time-varying state information in the form of a waveform file (e.g., in FSDB or WDF format), at 142. This could be the same waveform file where the nodal voltages or branch currents are saved or could be a separate file. In one implementation, the system assigns unique integers to each state of a device such that the time-varying voltage waveform format could be used without modification to store time-varying state transition (or activity) data. For instance, for MOSFET states, the system may assign 0 for cutoff, 1 for linear, and 2 for saturation region of operation. The system may assign any integer assignment without deviating from the scope of the present disclosure. The transition between different states (integers) is what constitutes activity.

The system may also save the time-varying nodal voltages and/or branch currents into a waveform file, at 144.

In one embodiment, the system generates two sets of sparklines (e.g., in PNG format). At 152, the system generates a first set of sparklines for the activity levels based on the device state waveforms. At 154, the system generates a second set of sparklines for the nodal voltage signal based on the nodal voltage waveforms. Sparkline graphs are compressed representations of the waveforms. A sparkline graph refers to a relatively small line chart that represents a general shape of the variation of a respective activity level or a voltage over time. This allows the user to quickly visualize many different waveforms. Sparklines also occupy less memory than the full resolution waveform.

From the activity waveform file, for each device, the system determines the activity level of the device, at 160. In this case, the activity level is a count of the number of transitions between states. The system saves the transition count as a measure of the device activity level. The number of transition counts (or other measure of device activity level) is used at 170 and 180 to annotate each device in the treemap view and in the design hierarchy view.

The system generates a hierarchical representation of the circuit, for example a treemap view of the circuit netlist 120 at 170. The treemap representation may use blocks, nodes, and/or devices from the hierarchical representation as objects, or leaves, in the treemap view. The leaves may be positioned in the treemap representation independent of their physical layout in the circuit. The treemap view is a hierarchical representation of the circuit, in that it shows the hierarchy of the circuit with block, sub-block, sub-sub-blocks down to the lowest level elements (base element), which in this example is individual transistors. Other hierarchical representations may also be used.

The system color codes the devices in the treemap view based on the device activity levels as determined at 160. The system also provides the sparkline graphs of each device's activity (generated at 152) to the user upon request (e.g., as a tooltip) for quick view in the context of the circuit's treemap. If the user is interested in the details of the activity, they could open the corresponding detailed waveform from the waveform file created by the simulator. The sparklines provide sufficiently detailed view of the activity in the context of the circuit's design hierarchy which is meaningful to the user.

At 180, the system generates a signal-flow representation of the circuit, for example, a graph of the channel-connected blocks (CCB) of the circuit. This is a directed graph where each node is a CCB in the circuit. A CCB may also be known as, but not limited to a channel-connected component, a direct current (DC) connected component, and a DC connected block. Specifically, for MOSFET circuits, a CCB includes all the nodes in the circuit that are directly reachable from one another by means of tracing source-drain connections of MOSFETs but stopping at power-supply nodes.

In MOSFET circuits, the input to such a CCB would commonly be the gate of one or more MOSFETs in the CCB and the power supply nodes. The output of such a CCB would be the source or drain of one or more MOSFETs in the CCB. In a general circuit, this concept can be extended to path tracing of all potential low-impedance paths (not just source-drain of MOSFETs) in a circuit with high-impedance ports being candidates for inputs and low impedance ports being candidates of outputs of such CCBs.

Based on the above definition of a CCB, a graph can be constructed by placing a directed edge between two CCBs in a circuit corresponding to the input-output relationship between such CCBs. The direction of an edge in the graph is from the output port of a CCB to the input port of another (or same) CCB.

The CCB graph is a signal-flow representation of the circuit, in that it shows the flow of signals from input through circuit elements (CCBs in this example) to output. Other signal-flow representations may also be used.

The system annotates each node in the graph with the same color scheme as used in annotating the treemap view of the same circuit. In this example, each node is color coded according to the device activity level. This makes it easier for the user to correlate locations in the signal-flow view of their design with the corresponding hierarchical view. Since each CCB may contain more than one device, in one approach, the system chooses the color based on the maximum activity of all devices in the CCB. Other approaches may be used, for example based on the average activity level instead.

Each CCB may have one or more output nodes which are inputs to other CCBs. Sparklines for the nodal voltage signals corresponding to the CCBs' output nodes are made available to the user in the interactive CCB graph view. The user may choose to view all such output node sparklines overlaid on corresponding CCBs simultaneously or may choose to view them selectively.

At 190, the system makes graphical associations between the hierarchical representation (treemap view) and signal-flow representation (CCB graph view), for example, as follows:

Relating a treemap to a CCB graph: When a user clicks or selects a treemap element, the corresponding element in the CCB graph view could be highlighted or brought into view if the user so chooses.

Relating a CCB graph to a treemap: When a user clicks or selects a CCB element, the corresponding device elements could be highlighted in the treemap view if the user so chooses.

If the user provides a schematic view representation of the netlist, the system may also make graphical associations between both the treemap view and the CCB graph view and the schematic view in the following way:

Relating a treemap to a schematic: When a user clicks or selects a treemap element, the corresponding devices in the schematic could be highlighted or brought into view if the user so chooses.

Relating a schematic to a treemap: When a user clicks or selects a device or group of devices in the schematic view, the corresponding device elements could be highlighted in the treemap view if the user so chooses.

Relating a CCB graph to a schematic: When a user clicks or selects one or more CCBs in the CCB graph, the corresponding devices could be highlighted or brought into view if the user so chooses.

Relating a schematic to a CCB graph: When a user clicks or selects a device or group of devices in the schematic view, the corresponding CCBs containing these devices in the CCB graph could be highlighted if the user so chooses.

The connections between the views may be implemented by application programming interface (API) calls among the three views (treemap, CCB graph, and schematic).

FIGS. 2-6 illustrate an example, which is based on a small circuit (an 8-bit digital-to-analog converter (DAC8B1)).

Figure 2:
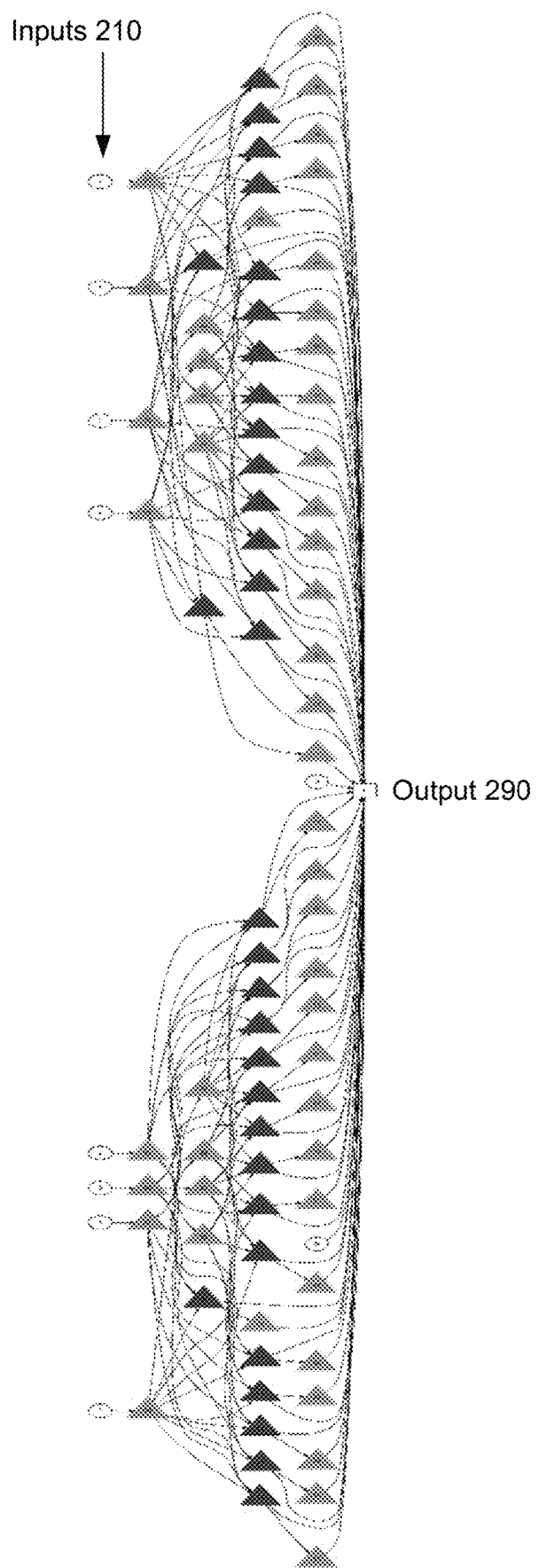
FIG. 2 depicts a graph of channel-connected blocks (CCBs) for an analog/mixed signal (A/MS) benchmark circuit.

FIG. 2 shows the graph of interconnected CCBs from the DAC8B1 circuit. The node colors in this figure are used to depict the functionality of the CCB—whether they are inverters, dual-CMOS, or analog etc. The 8-bit digital-to-analog converter has 8 input signals, which correspond to the eight white oval nodes 210 to the left of the graph, which contain eight voltage sources. The green triangle nodes represent CMOS inverters, while the blue triangle nodes are either NAND or NOR CMOS gates each having more than one input. The right-most white rectangular node 290 is a CCB that contains the output signal node "dacout" of the circuit. The edges between nodes (represented by lines between the elements in FIG. 2) represent the signal flow through the circuit.

DAC8B1 is a MOSFET-only circuit. In this example, the system uses the time-dependent state of each MOSFET—cutoff, linear, or saturation—to determine device activity caused by an input stimulus.

In this example, the DAC8B1 circuit is simulated using a transistor-level circuit simulator, using two different input stimuli, referred to as "fast" and "full." For each of these two different input stimuli, the resulting simulation produces two sets of waveform files. One set of waveform files contains the time-dependent nodal voltages of each node (CCB) in the circuit. The other set of waveform files contains the time-dependent state transition graph of each MOSFET in the circuit.

For each simulation, "fast" and "full," the system obtains two sets of waveform files as described above: one set for nodal voltage signals, and another set for device activities. For each individual waveform in each waveform file, the system compresses the time charts into tiny 100×50 PNG files. Each chart has a horizontal line corresponding to "0" and the maximum value of the graph is annotated at the top. The 0-reference line, the max value, and the time-varying graph together provide enough information to the user about the nature of the nodal voltage activity.

Figure 5:
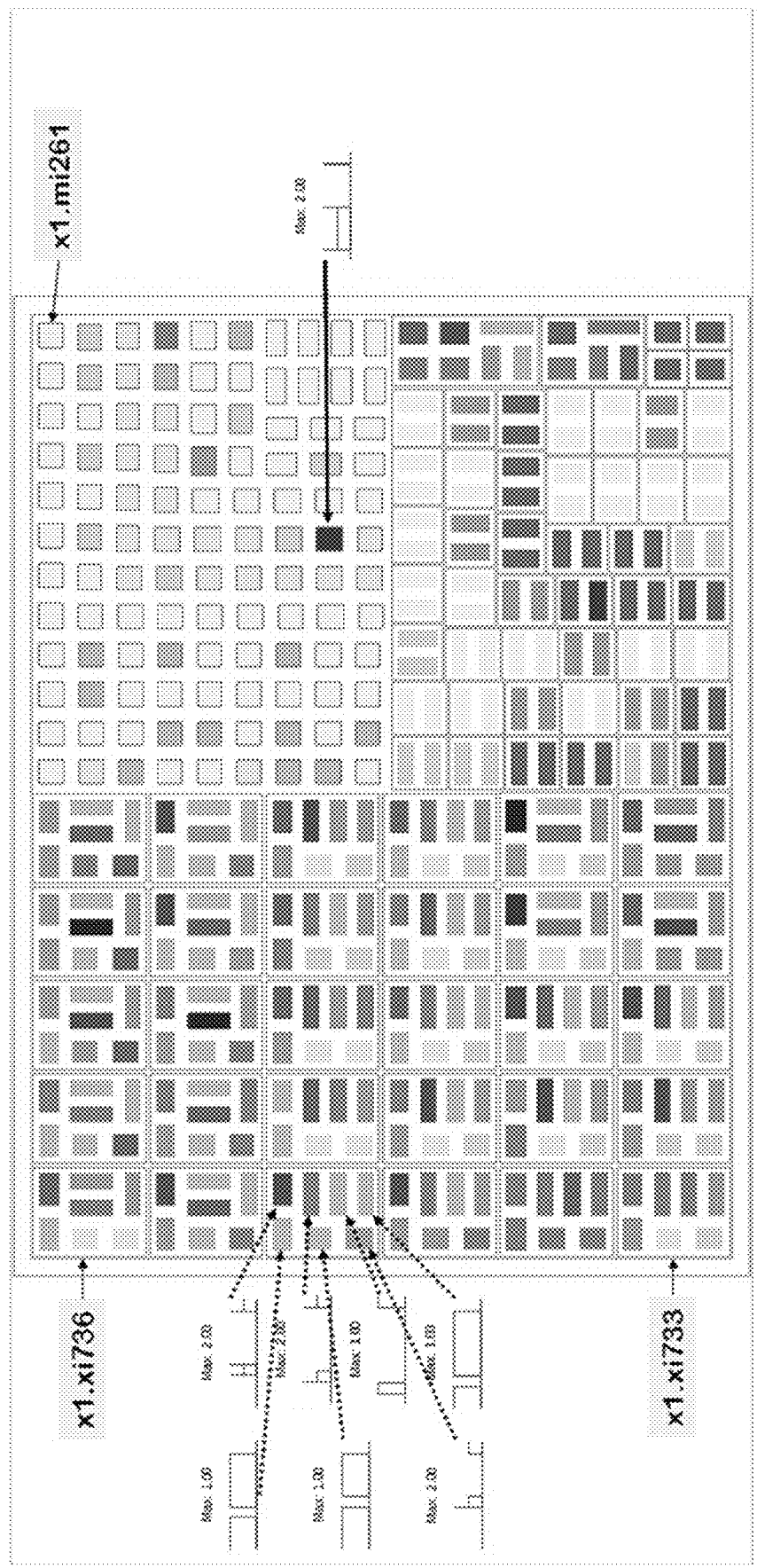
FIG. 5 depicts an annotated treemap view of the A/MS benchmark circuit for the "fast" input stimulus.
Figure 6:
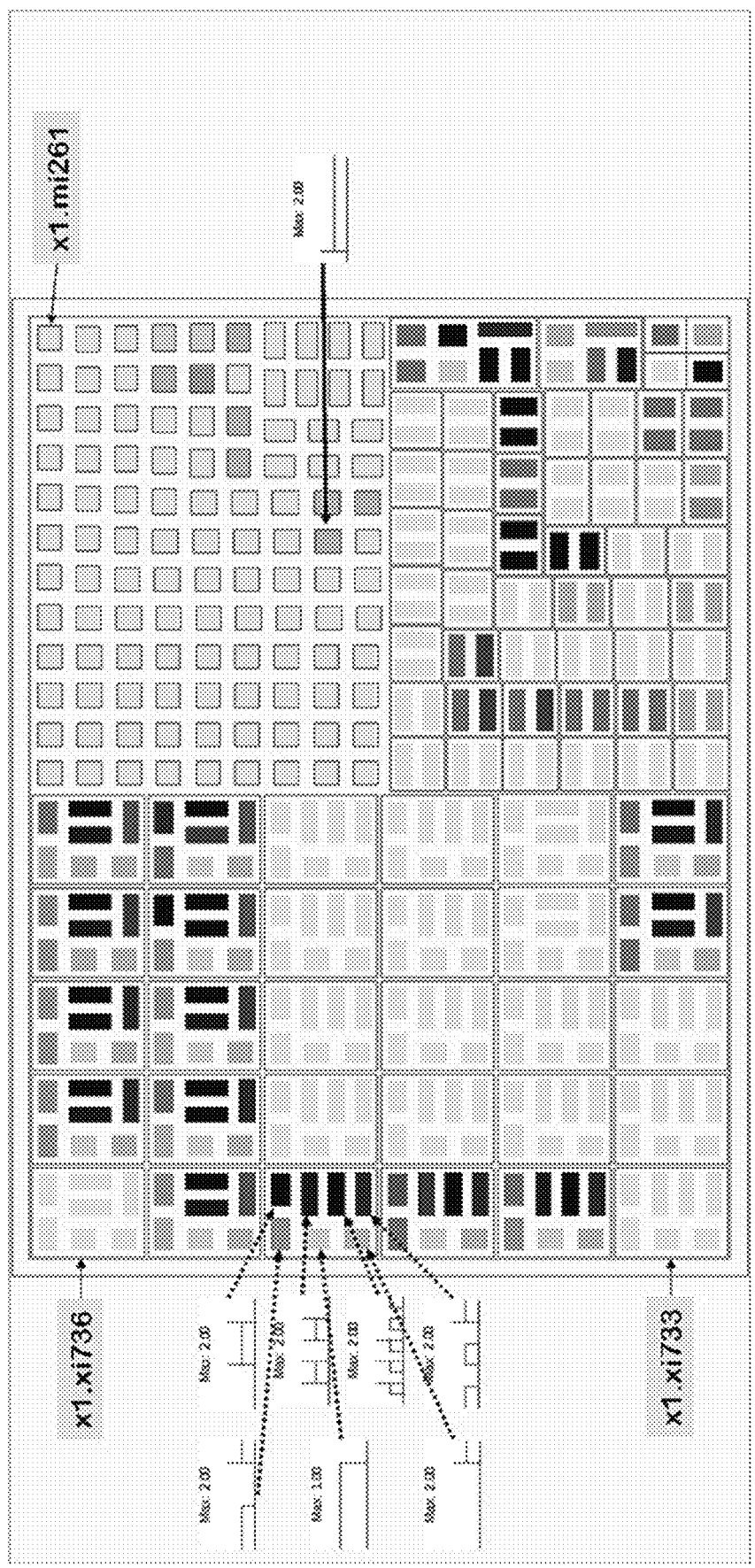
FIG. 6 depicts an annotated treemap view of the A/MS benchmark circuit for the "full" input stimulus.

FIGS. 3A-3C and 4A-4C show the annotated CCB graph views (e.g., at 180) for the "fast" and "full" input stimuli, respectively. FIGS. 5 and 6 show the annotated treemap views (e.g., at 170) for the "fast" and "full" input stimuli, respectively.

FIGS. 3 and 4 show the CCB graphs of the DAC8B1 circuit (which is the same as the graph of nodes and edges in FIG. 2 as shown by inputs 210 and output 290), but annotated with the following:

Color coding for device activity level. The higher the activity level, the darker the shade of blue. In this example, the activity level of a CCB is defined as the maximum activity level of any device in the CCB.

Sparkline of voltage waveform of the output node of the CCB. These are overlaid on the corresponding CCB. In the GUI, these can be made to appear and disappear according to user commands.

Figure 3A:
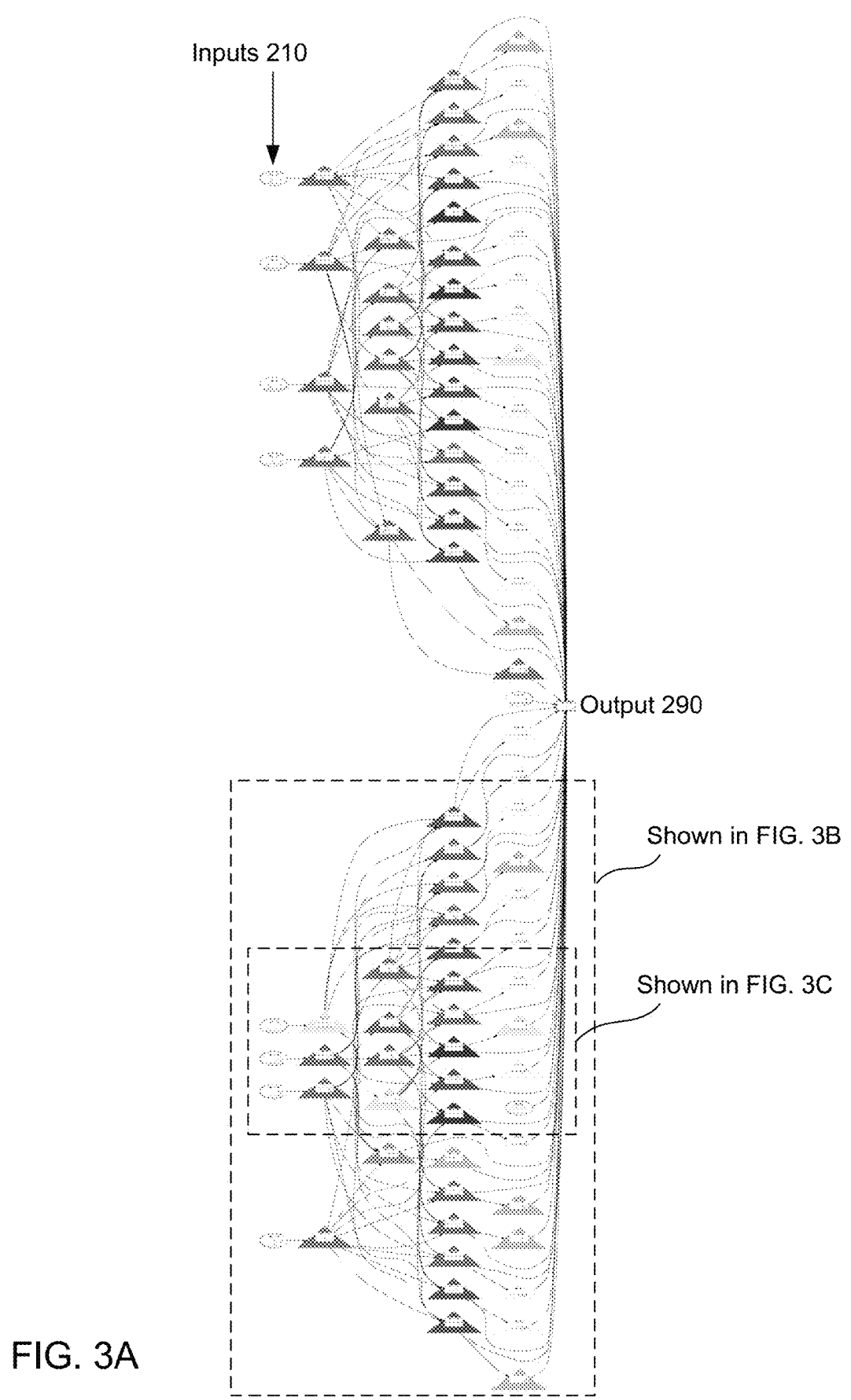
FIG. 3A depicts an annotated CCB graph of an A/MS benchmark circuit for a "fast" input stimulus.
Figure 3B:
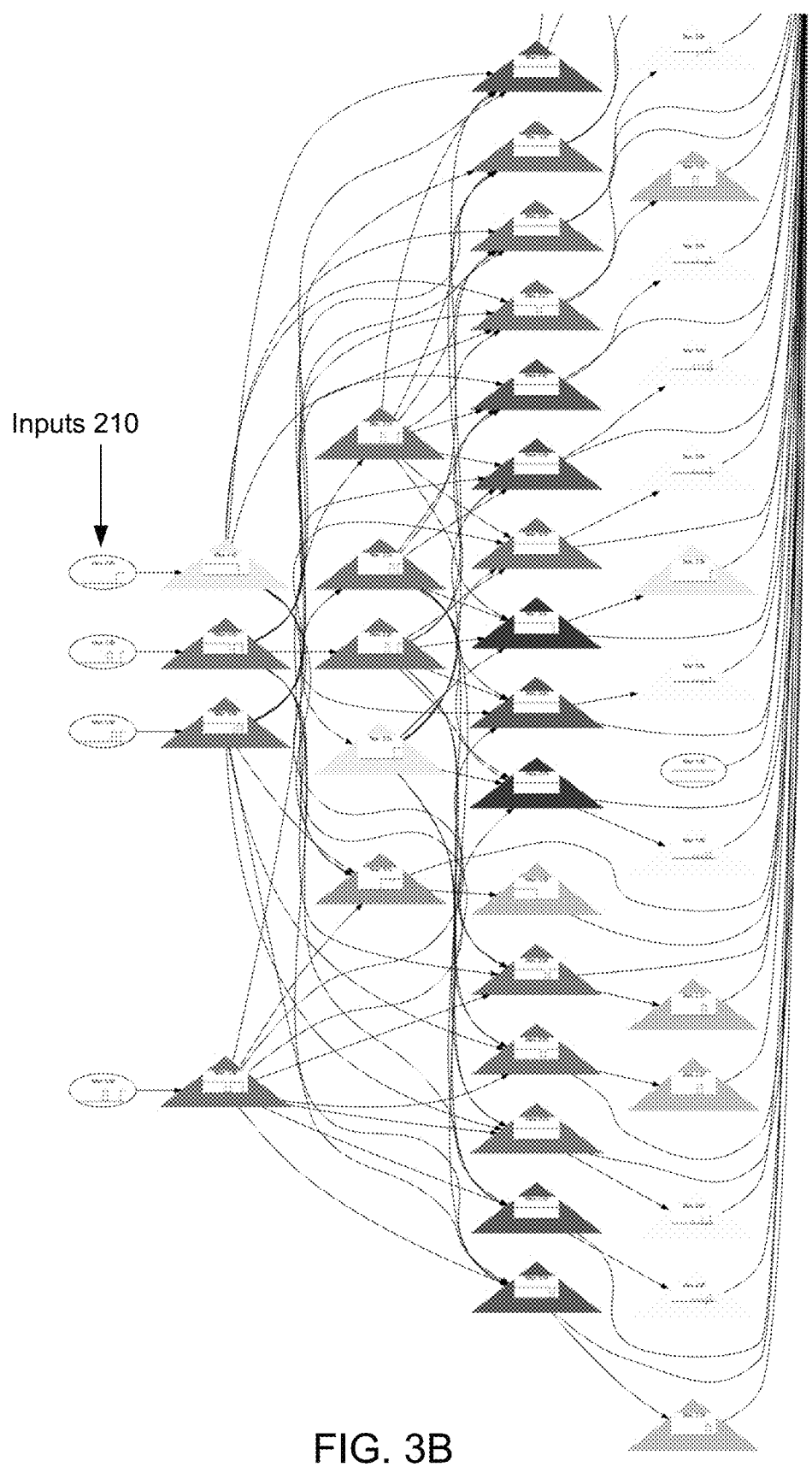
FIGS. 3B and 3C are zoomed versions of FIG. 3A.
Figure 3C:
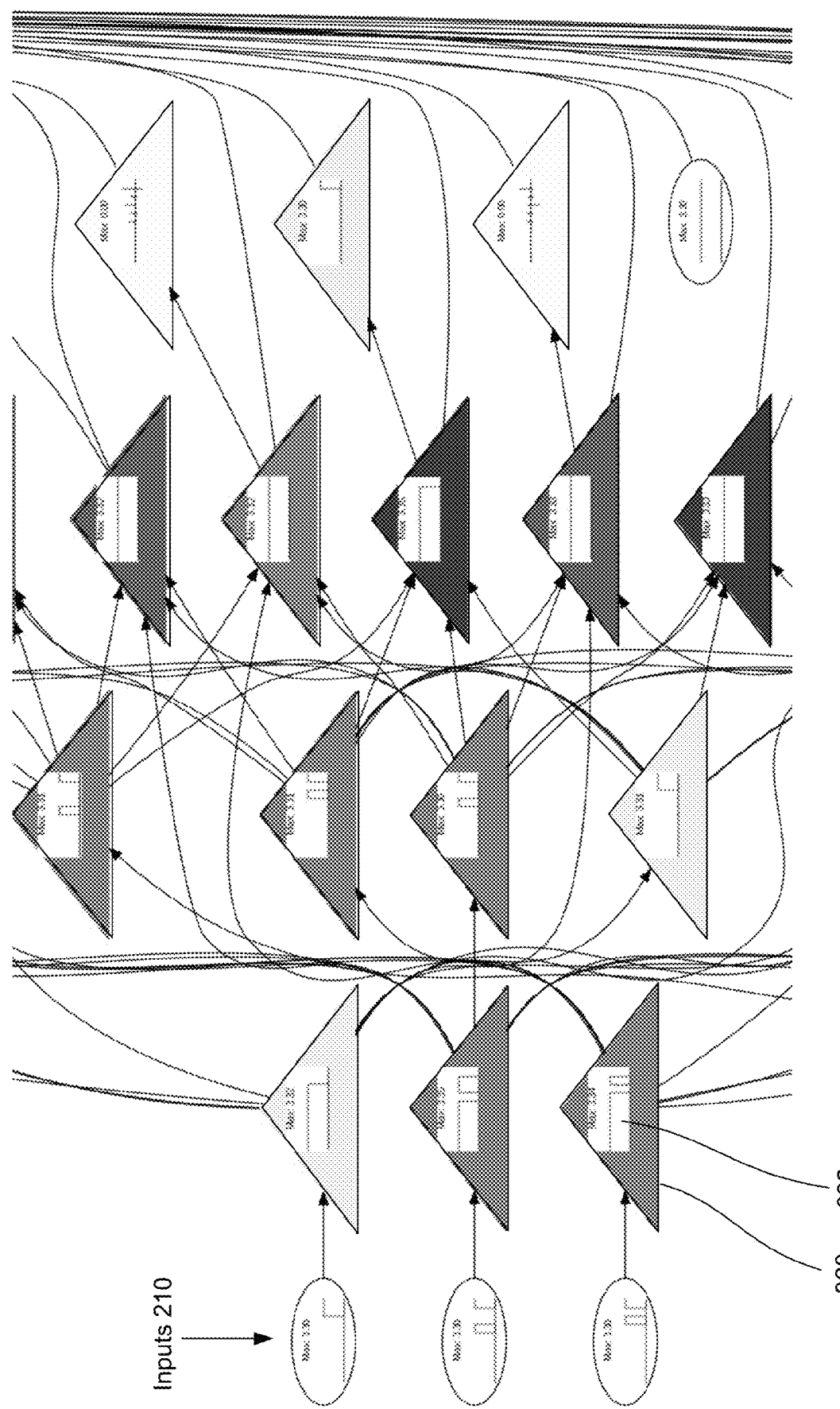

FIG. 3A is the complete graph for the "fast" stimulus simulation. As annotated in FIG. 3A, FIG. 3B is a zoomed-in view of the bottom half of FIG. 3A and FIG. 3C is a zoomed-in view of the central part of FIG. 3B. The color coding of the individual graphical elements (triangles) and sparklines of the voltage levels are more visible in FIG. 3C. Referring to FIG. 3C, the white oval nodes 210 are input signals to the circuit, each triangle is a node (CCB), and the lines between triangles are edges (signal flow between CCBs). Using node 320 as an example, the node 320 has a medium blue color, which indicates moderate activity level. The sparkline 322 for this node shows that the node voltage for this CCB starts high, remains high for most of the simulation, and then toggles low, high, low towards the end of the simulation.

Figure 4A:
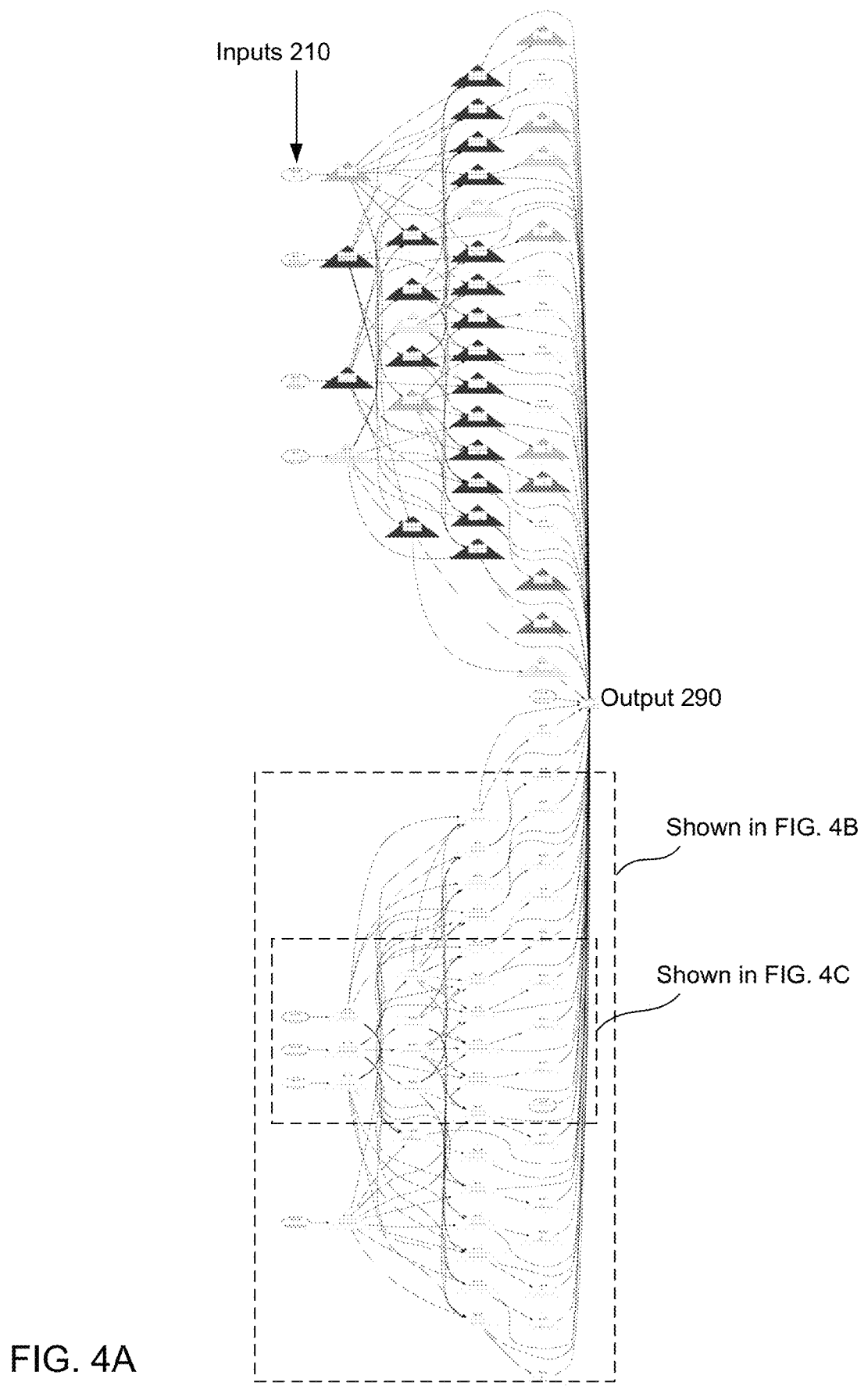
FIG. 4A depicts an annotated CCB graph of an A/MS benchmark circuit for a "full" input stimulus.
Figure 4B:
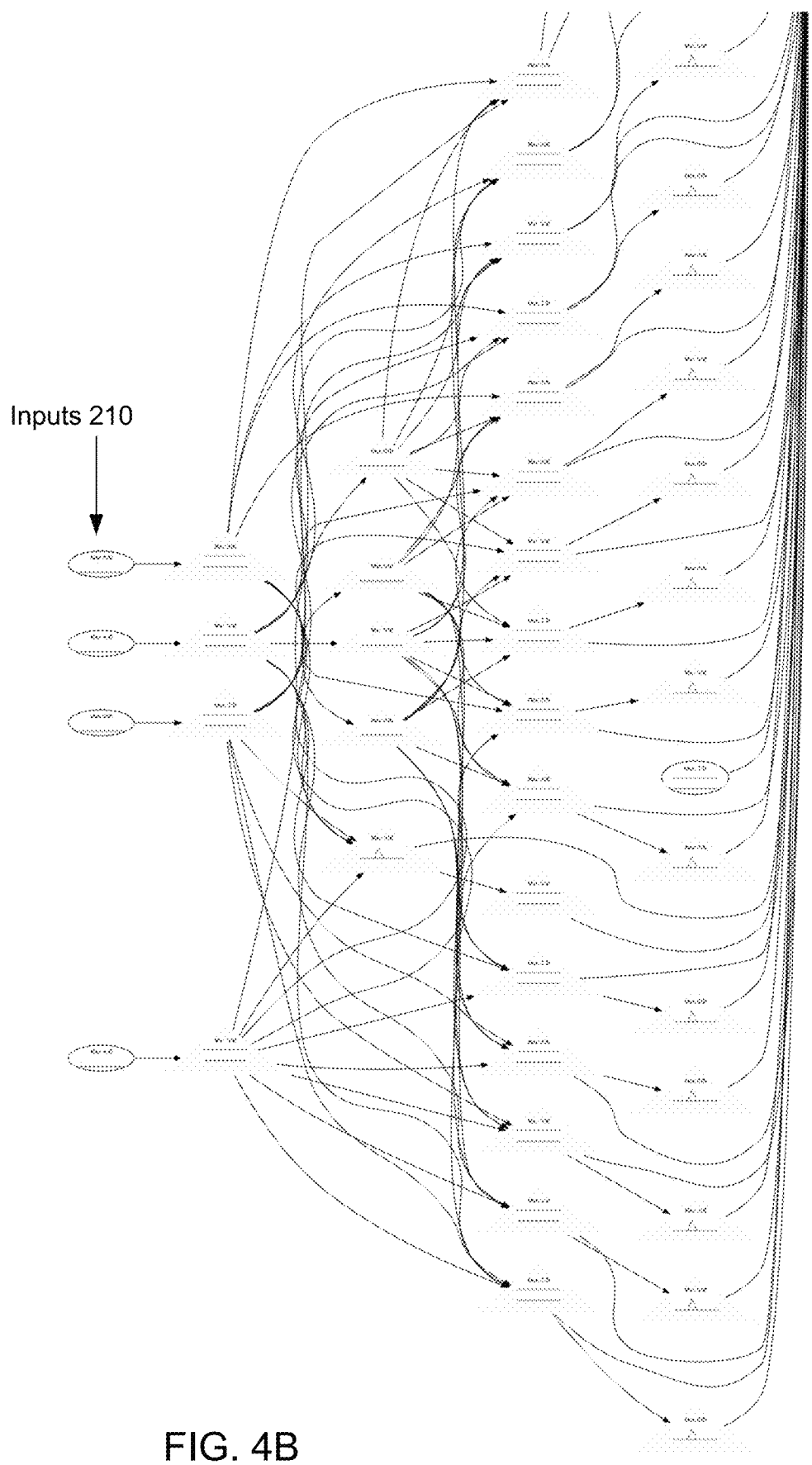
FIGS. 4B and 4C are zoomed versions of FIG. 4A.
Figure 4C:
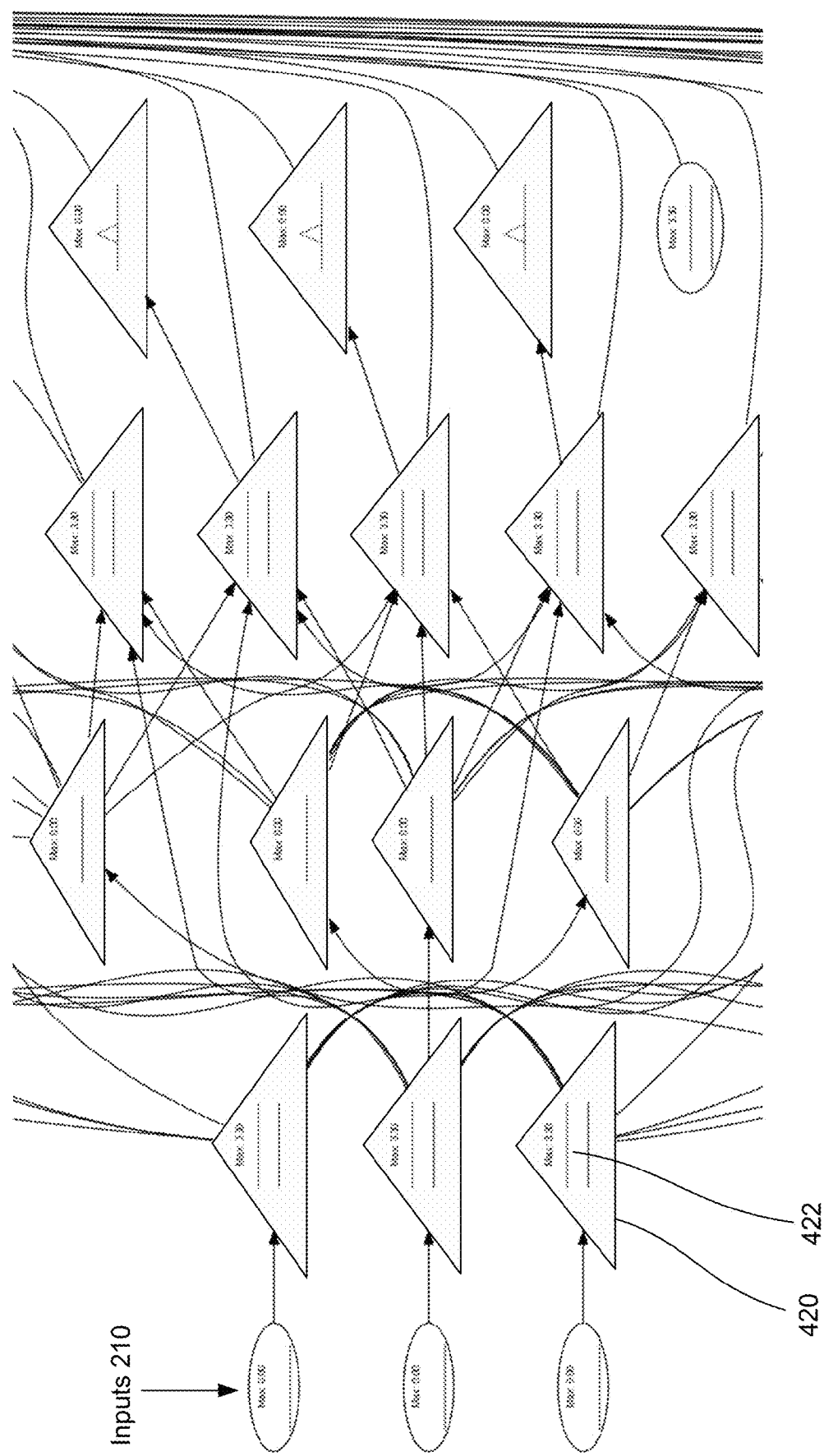

FIGS. 4A-4C are the same views, but for the "full" input stimulus. These views show the nodal voltage signals in the context of the signal-flow through the circuit. This is valuable and meaningful to the user since this clearly shows where and how the activities propagate through the circuit. It also allows comparison of the two input stimuli. For example, node 420 is the same as node 320 in FIG. 3. However, for the full input stimulus, the node 420 is very light blue color, indicating low activity level. The sparkline 422 shows a constant nodal voltage for the full input stimulus.

The system provides a user interface to display the activities on the CCB graph based on one stimulus to allow the user to understand what could be improved in terms of, for example, fault sensitization. The present system further provides a user interface to display the activities on two or more CCB graphs of the same circuit corresponding to different stimuli and compare them with the goal of, for example, finding regions that are not activated by any of the stimuli or hard-to-sensitize defects/faults etc. For example, comparing FIGS. 3 and 4 shows that the "full" stimulus produces lower activity in the lower half of the CCB (as shown in FIG. 4) compared to the "fast" stimulus (as shown in FIG. 3). In analog and mixed-signal circuits, such information is useful in, for example, generating new test stimuli or improving existing tests to improve defect or fault coverages.

FIGS. 5 and 6 show the treemap views of the design hierarchy of DAC8B1 circuit for the "fast" and "full" simulations, respectively. In the treemap view, each rectangle represents a device and the view also shows the hierarchy. For example, in FIG. 5, the block x1.xi736 includes 7 devices (7 transistors), x1.mi261 is a single loose transistor, etc. The treemap view can show many levels of hierarchy. It is annotated with the following:

Color coding for device activity. Each smallest colored rectangle is a device. In this circuit, they happen to be MOSFETs. The higher the activity level of the device, the darker the shade of blue.

Sparkline of device activity waveform. These appear when the user requests to see them on the GUI by clicking inside the rectangular area of a device or by hovering over a device. The waveform appears as a tooltip in the GUI. There is also a mode where all the sparklines in a particular region or the whole treemap are visible simultaneously.

The annotated treemap views offer a way of looking at the activities in a circuit with respect to design hierarchy. For a user who is aware of a higher-level abstraction of a design, this hierarchical view provides a powerful way to understand the impact of a stimulus and compare among multiple stimulus on the same circuit.

The CCB graph views and the treemap views are useful on their own in providing the user with powerful tools to analyze the qualities of various stimuli. The system may also graphically associate the CCB graph views with the corresponding treemap views. That is, both views corresponding to a stimulus can be opened side-by-side and highlighting CCB(s) in the graph view would automatically highlight the corresponding device(s) in the treemap view, and vice versa. Additionally, if a user wants to see details of a sparkline waveform (of nodal voltage or device activity), double clicking the sparkline picture opens up the detailed view of the corresponding waveform in a waveform viewer.

By combining a circuit's signal-flow graph represented by the CCB graph along with the annotated treemap view picture of the circuit, the user can study the impact of the stimulus with enough detail to evaluate its quality with respect to, say, fault/defect sensitization or other types of activity-related hot spots. The signal-flow information provided by the CCB graph view and the design hierarchical context provided by the treemap view are complementary in nature. When used in conjunction, the combined information can provide the user with deeper insight regarding the effect of stimulus on a circuit.

The user may also interact with the different views to understand the activity levels created by different input stimuli. For example, the user may zoom in and out of a view. As the user zooms the view, the different graphical elements may be aggregate or disaggregated. If multiple elements are combined into one graphical element when the user zooms out, the new graphical element may be color coded based on the activity levels of the included devices. Maximum activity level and average activity level are two options. The user may also filter the views. The user may want to study only certain types of devices, so the view may be filtered to see only those types of devices. The filtering may also be based on device name, the blocks and hierarchy within the circuit or ranges of the activity levels, to give some examples.

The activity levels for different stimuli may also be filtered or combined to better understand the coverage of a set of input stimuli. For example, each input stimulus may be used to produce a graphical representation. These graphical representations have the same structure (e.g., same CCBs connected in the same flow, or same hierarchy of devices), but the activity levels may be different for different stimuli. These may be combined in different ways to show activity levels for the set of stimuli. For example, a composite graphical representation may be rendered based on the intersection of the individual stimuli (activity level high for all stimuli) or based on the union of the individual stimuli (activity level high for at least one stimulus). Other combinations will be apparent. Alternatively, the graphical representations for different input stimuli may be viewed together for comparison: superimposed or side-by-side, for example.

Figure 7:
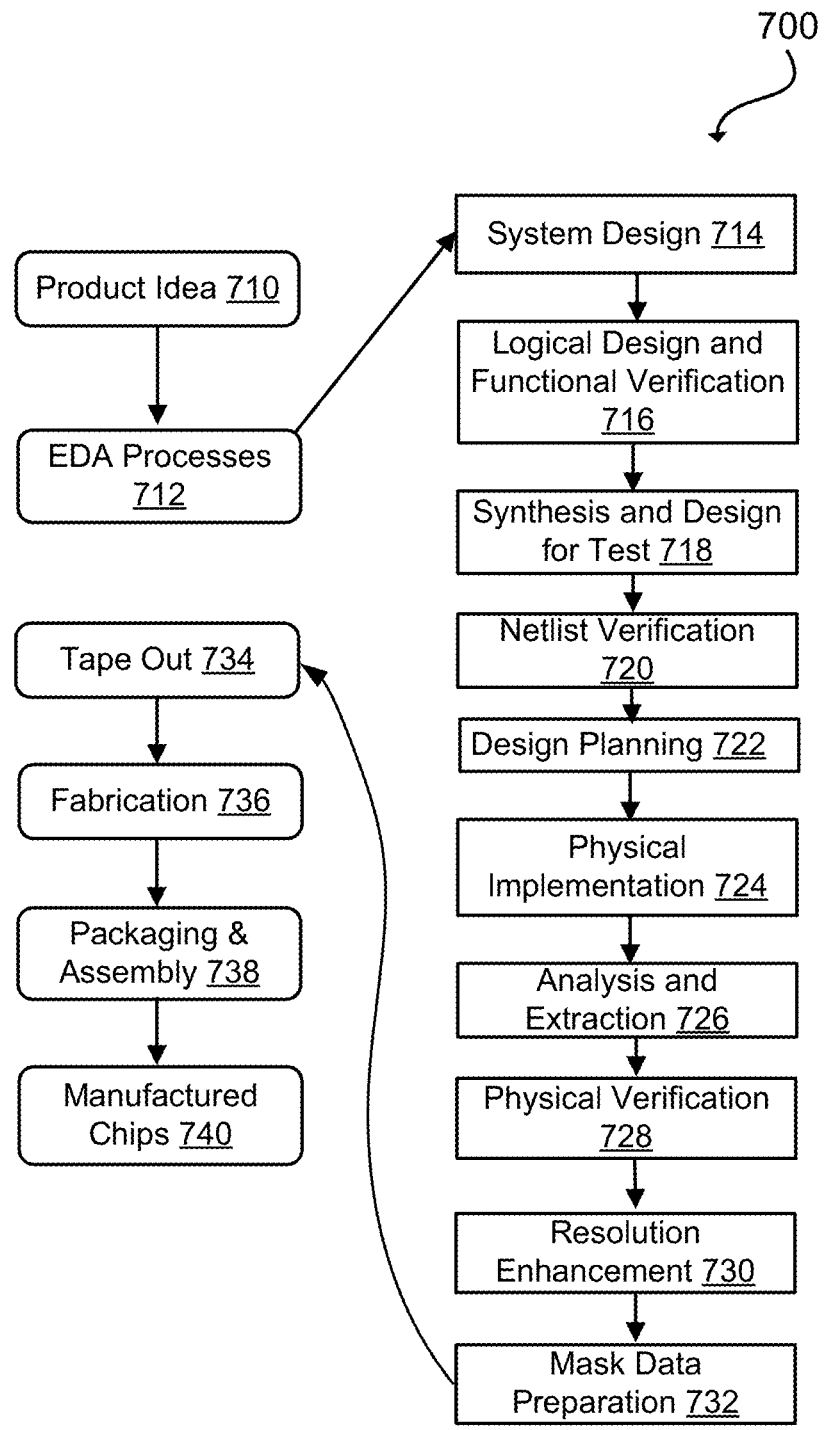
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 7. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
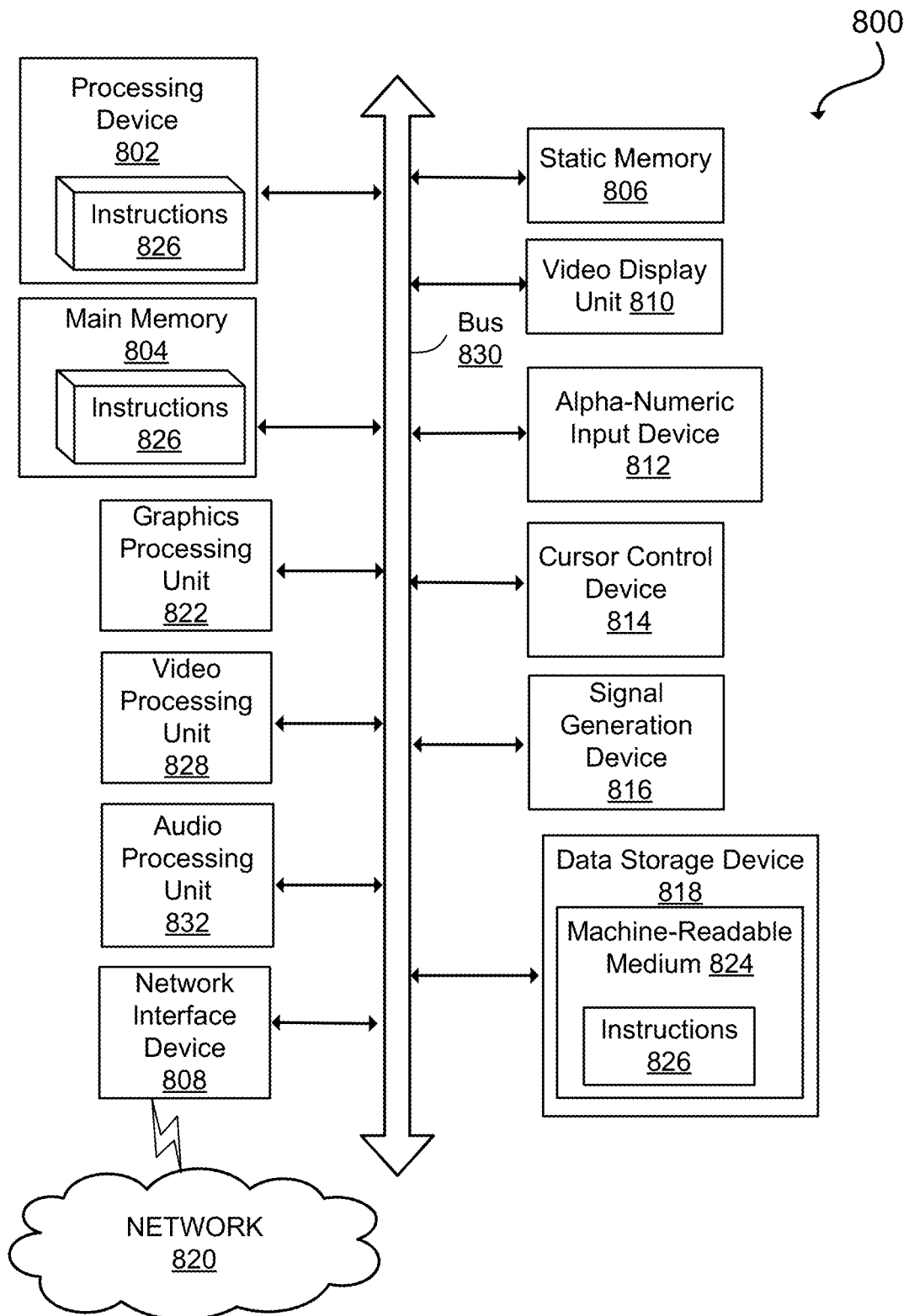
FIG. 8 depicts a diagram of an example computer system in which embodiments of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
accessing a transistor-level circuit simulation of a circuit's response to an input stimulus, the circuit comprising a plurality of transistors;
determining activity levels for the transistors in the circuit from the transistor-level circuit simulation; and
rendering, by a processor, a graphical representation of the circuit, wherein the graphical representation comprises:
graphical elements that represent components of the circuit, wherein the graphical elements are color coded according to the activity levels of the transistors in the corresponding components; and
at least one of sparkline graphs showing the activity levels of the components and sparkline graphs showing nodal voltages of the components.

2. The method of claim 1, wherein the graphical representation comprises a hierarchical representation of the circuit.

3. The method of claim 2, wherein the hierarchical representation uses transistors as a base element in the hierarchical representation.

4. The method of claim 2, wherein the graphical representation comprises a treemap view of a hierarchy of the circuit.

5. The method of claim 2, wherein the graphical representation comprises sparkline graphs showing the activity levels of the components in the hierarchical representation of the circuit.

6. The method of claim 1, wherein the graphical representation comprises a signal-flow representation of the circuit.

7. The method of claim 6, wherein the signal-flow representation uses channel-connected blocks as a base element in the signal-flow representation.

8. The method of claim 6, wherein the graphical representation comprises sparkline graphs showing nodal voltages of the components in the signal-flow representation of the circuit.

9. The method of claim 1, wherein the graphical representation comprises a hierarchical representation of the circuit, a signal-flow representation of the circuit and a schematic view representation of the circuit, the method further comprising: graphically associating corresponding elements of the hierarchical representation, the signal-flow representation and the schematic view representation.

10. A system comprising:
a memory storing instructions; and
a processor, coupled with the memory and to execute the instructions, the instructions when executed cause the processor to:
access a transistor-level description of a circuit comprising a plurality of transistors;
perform a transistor-level circuit simulation of the circuit's response to an input stimulus, based on the transistor-level description of the circuit;
determine activity levels for the transistors in the circuit from the transistor-level circuit simulation; and
render (a) a hierarchical representation of the circuit, wherein the hierarchical representation comprises first graphical elements that represent hierarchical components of the circuit, and the first graphical elements are color coded according to the activity levels of the transistors in the corresponding hierarchical components; and (b) a signal-flow representation of the circuit, wherein the signal-flow representation comprises second graphical elements that represent signal-flow components of the circuit, and the second graphical elements are color coded according to the activity levels of the transistors in the corresponding signal-flow components; and
graphically associating corresponding first and second graphical elements of the hierarchical representation and the signal-flow representation, respectively.

11. The system of claim 10, wherein the activity levels of the transistors are based on time-varying states of the transistors during the transistor-level circuit simulation.

12. The system of claim 10, wherein the activity levels of the transistors are based on transitions between different regions of operation of the transistors.

13. The system of claim 12, wherein the different regions of operation comprise one or more of a linear region of operation, a cutoff region of operation and a saturation region of operation.

14. The system of claim 10, wherein the activity levels of the transistors are user-defined.

15. The system of claim 10, wherein the circuit is an analog/mixed signal circuit, and wherein the processor determines activity levels for transistors in the circuit based on waveform files produced by the transistor-level circuit simulation.

16. A non-transitory computer readable medium comprising stored instructions, which when executed by a processor, cause the processor to perform a method comprising:
receiving a user command identifying at least two different input stimuli to a circuit;
accessing activity levels for devices in the circuit, the activity levels indicating the devices' activity levels in response to each of the different input stimuli; and
rendering, by a processor, graphical representations of the circuit for each of the different input stimuli, wherein the graphical representations comprise graphical elements that represent components of the circuit, the graphical elements are visually coded according to the activity levels of the devices in the corresponding components in response to each of the different input stimuli, and the graphical representations for the different input stimuli are simultaneously visible to the user.

17. The computer readable medium of claim 16, wherein the method further comprises:
receiving a user command to zoom in/out the graphical representation;
disaggregating/aggregating the graphical elements in response to the user command; and
modifying the visual coding according to the activity levels of the transistors in the components corresponding to the disaggregated/aggregated elements.

18. The computer readable medium of claim 16, wherein the method further comprises:
receiving a user command to filter the graphical representation; and
modifying the graphical representation according to the user command.

19. The computer readable medium of claim 18, wherein the user command include filtering the graphical representation based on at least one of names of the devices, types of devices, and ranges of activity levels for the devices.

20. The computer readable medium of claim 16, wherein the graphical elements in the graphical representations for different input stimuli are color coded according to a same color coding scheme.

* * * * *